US012659740B2

(12) United States Patent
  Atarius et al.

(10) Patent No.: US 12,659,740 B2
(45) Date of Patent: Jun. 16, 2026

(54) REGISTRATION AUTHENTICATION BASED ON A TYPE OF AUTHENTICATION PROCEDURE AND A CAPABILITY

(71) Applicant: Lenovo (Singapore) Pte. Ltd., New Tech Park (SG)

(72) Inventors: Roozbeh Atarius, La Jolla, CA (US); Andreas Kunz, Ladenburg (DE); Genadi Velev, Darmstadt (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 172 days.

(21) Appl. No.: 18/550,665

(22) PCT Filed: Mar. 14, 2022

(86) PCT No.: PCT/IB2022/052299
  § 371 (c)(1),
  (2) Date: Sep. 14, 2023

(87) PCT Pub. No.: WO2022/195461
  PCT Pub. Date: Sep. 22, 2022

(65) Prior Publication Data
  US 2024/0187856 A1    Jun. 6, 2024

Related U.S. Application Data

(60) Provisional application No. 63/161,395, filed on Mar. 15, 2021.

(51) Int. Cl.
  *H04L 9/40*        (2022.01)
  *H04L 9/28*        (2006.01)
          (Continued)

(52) U.S. Cl.
  CPC ........... *H04W 12/062* (2021.01); *H04W 4/90* (2018.02); *H04W 12/069* (2021.01)

(58) Field of Classification Search
  CPC .... H04W 12/062; H04W 4/90; H04W 12/069
          (Continued)

(56) References Cited

U.S. PATENT DOCUMENTS 11,051,161 B1 *  6/2021  Wang ................... H04W 12/06
11,310,731 B1 *  4/2022  Feder ..................... H04W 8/08
          (Continued)

FOREIGN PATENT DOCUMENTS

CN        115104332 A  *  9/2022  ........... H04L 63/083
WO  WO-2019122495 A1 *  6/2019  ............. H04L 63/08
          (Continued)

OTHER PUBLICATIONS

PCT/IB2022/052299, "International Search Report and the Written Opinion of the International Searching Authority, or the Declaration", International Searching Authority, Jun. 7, 2022, pp. 1-13.
          (Continued)

*Primary Examiner* — Haresh N Patel
(74) *Attorney, Agent, or Firm* — Kunzler Needham & Hilton; Bruce R. Needham

(57)        ABSTRACT

Apparatuses, methods, and systems are disclosed for registration authentication based on a capability. One method includes receiving, at a second network device from a first network device, an indication for a capability for a registration. The method includes transmitting, to a third network device, a first request for a type of authentication procedure for the registration. The method includes transmitting, to a remote unit, a second request. The second request corresponds to the type of authentication procedure for the registration. The method includes receiving, from the remote unit, a response to the second request. The response corresponds to a stored credential in the remote unit.

17 Claims, 9 Drawing Sheets

400

(51) Int. Cl.
    *H04W 4/90*       (2018.01)
    *H04W 12/062*    (2021.01)
    *H04W 12/069*    (2021.01)

(58) Field of Classification Search
    USPC ........................................................... 726/4
    See application file for complete search history.

(56) References Cited

U.S. PATENT DOCUMENTS

| | | | |
|---|---|---|---|
| 12,273,711 B2 * | 4/2025 | Ben Henda | H04W 48/18 |
| 2018/0376446 A1 * | 12/2018 | Youn | H04W 68/005 |
| 2019/0007500 A1 * | 1/2019 | Kim | H04L 67/141 |
| 2019/0007992 A1 * | 1/2019 | Kim | H04W 76/27 |
| 2019/0021064 A1 * | 1/2019 | Ryu | H04W 60/06 |
| 2019/0052580 A1 * | 2/2019 | Peng | H04L 47/825 |
| 2019/0059067 A1 * | 2/2019 | Lee | H04L 67/141 |
| 2019/0116486 A1 * | 4/2019 | Kim | H04W 8/10 |
| 2019/0230556 A1 * | 7/2019 | Lee | H04W 28/16 |
| 2019/0261178 A1 * | 8/2019 | Rajadurai | H04W 12/069 |
| 2019/0268752 A1 * | 8/2019 | Buckley | H04W 8/06 |
| 2019/0289672 A1 * | 9/2019 | Ben Henda | H04W 12/041 |
| 2019/0335534 A1 * | 10/2019 | Atarius | H04L 65/1016 |
| 2019/0357129 A1 * | 11/2019 | Park | H04W 60/04 |
| 2019/0364541 A1 * | 11/2019 | Ryu | H04W 80/10 |
| 2020/0014535 A1 * | 1/2020 | Baskaran | H04W 12/062 |
| 2020/0053083 A1 * | 2/2020 | Kunz | H04W 12/72 |
| 2020/0053133 A1 * | 2/2020 | Atarius | H04L 69/164 |
| 2020/0068391 A1 * | 2/2020 | Liu | H04W 12/06 |
| 2020/0163132 A1 * | 5/2020 | Li | H04W 8/26 |
| 2020/0178048 A1 * | 6/2020 | Kim | H04W 12/062 |
| 2020/0178343 A1 * | 6/2020 | Kim | H04W 76/27 |
| 2020/0221281 A1 * | 7/2020 | Rajadurai | H04W 76/30 |
| 2020/0221299 A1 * | 7/2020 | Suthar | H04W 60/00 |
| 2020/0228982 A1 * | 7/2020 | He | H04W 12/04 |
| 2020/0275279 A1 * | 8/2020 | Tangudu | H04W 12/06 |
| 2020/0336305 A1 * | 10/2020 | Li | H04L 9/0844 |
| 2020/0344359 A1 * | 10/2020 | Sun | H04W 8/20 |
| 2020/0344603 A1 * | 10/2020 | Gamishev | H04W 12/06 |
| 2020/0344604 A1 * | 10/2020 | He | H04L 9/30 |
| 2020/0396673 A1 * | 12/2020 | Tiwari | H04W 48/16 |
| 2020/0396788 A1 * | 12/2020 | Tiwari | H04W 76/11 |
| 2020/0396792 A1 * | 12/2020 | Tiwari | H04W 36/0085 |
| 2020/0396793 A1 * | 12/2020 | Tiwari | H04W 60/02 |
| 2021/0051468 A1 * | 2/2021 | Baskaran | H04W 48/16 |
| 2021/0058776 A1 * | 2/2021 | Nair | H04L 63/205 |
| 2021/0120409 A1 * | 4/2021 | Nair | H04L 9/0844 |
| 2021/0160691 A1 * | 5/2021 | Liu | H04W 12/037 |
| 2021/0184989 A1 * | 6/2021 | Wu | H04L 47/822 |
| 2021/0185631 A1 * | 6/2021 | Deng | H04W 12/037 |
| 2021/0235268 A1 * | 7/2021 | Wu | H04L 9/3242 |
| 2021/0250890 A1 * | 8/2021 | Won | H04W 48/16 |
| 2021/0258316 A1 * | 8/2021 | Liu | H04L 63/0876 |
| 2021/0258857 A1 * | 8/2021 | Won | H04W 60/005 |
| 2021/0314318 A1 * | 10/2021 | Gupta | H04W 12/069 |
| 2021/0329583 A1 * | 10/2021 | Baek | H04W 48/18 |
| 2021/0392495 A1 * | 12/2021 | Tsiatsis | H04W 12/40 |
| 2021/0392605 A1 * | 12/2021 | Park | H04W 60/005 |
| 2021/0409941 A1 * | 12/2021 | Rajendran | H04W 80/02 |
| 2021/0409952 A1 * | 12/2021 | Jost | H04W 12/106 |
| 2022/0007184 A1 * | 1/2022 | Ferdi | H04W 60/04 |
| 2022/0070649 A1 * | 3/2022 | Sahin | H04L 65/1073 |
| 2022/0116770 A1 * | 4/2022 | Li | H04L 63/0861 |
| 2022/0159460 A1 * | 5/2022 | Ben Henda | H04W 12/084 |
| 2022/0167157 A1 * | 5/2022 | Tiwari | H04L 9/3242 |
| 2022/0174483 A1 * | 6/2022 | Tiwari | H04W 12/06 |
| 2022/0182822 A1 * | 6/2022 | Ma | H04W 12/06 |
| 2022/0240213 A1 * | 7/2022 | Ly | H04W 60/02 |
| 2022/0256330 A1 * | 8/2022 | Rosa | H04W 12/06 |
| 2022/0312199 A1 * | 9/2022 | Ben Henda | H04W 12/06 |
| 2022/0329983 A1 * | 10/2022 | Jeong | H04W 12/06 |
| 2022/0337995 A1 * | 10/2022 | Baek | H04W 12/06 |
| 2022/0369363 A1 * | 11/2022 | Ferdi | H04W 4/44 |
| 2022/0377548 A1 * | 11/2022 | Rajadurai | H04W 12/08 |
| 2022/0408396 A1 * | 12/2022 | Youn | H04W 76/34 |
| 2023/0013118 A1 * | 1/2023 | Sharma | H04W 48/04 |
| 2023/0080836 A1 * | 3/2023 | Vahidi Mazinani | H04W 60/06 |
| | | | 455/435.1 |
| 2023/0145137 A1 * | 5/2023 | De Luca | H04W 12/06 |
| | | | 726/2 |
| 2023/0189187 A1 * | 6/2023 | Velev | H04W 48/16 |
| | | | 455/435.1 |
| 2023/0189190 A1 * | 6/2023 | Ding | H04L 5/0048 |
| | | | 455/415 |

FOREIGN PATENT DOCUMENTS

| | | | | |
|---|---|---|---|---|
| WO | 2020030851 A1 | 2/2020 | | |
| WO | WO-2021096193 A1 * | 5/2021 | ........... | H04W 60/06 |

OTHER PUBLICATIONS

Interdigital, "KI#4: Disaster inbound roamer Registration using a Disaster Response Function (DRF)", 3GPP TSG-CT WG1 Meeting #128-e C1-211370, Feb. 25-Mar. 5, 2021, pp. 1-5.

Simon et al., "The EAP-TLS Authentication Protocol", Network Working Group, RCF 5216, Mar. 2008, pp. 1-34.

3GPP, "3rd Generation Partnership Project; Technical Specification Group Core Network and Terminals; Study on the support for minimization of service interruption; (Release 17)", 3GPP TR 24.811 V0.2.0, Feb. 2021, pp. 1-79.

3GPP, "3rd Generation Partnership Project; Technical Specification Group Services and System Aspects; Security architecture and procedures for 5G system (Release 16)", 3GPP TS 33.501 V16.5.0, Dec. 2020, pp. 1-253.

* cited by examiner

100

104

104

102

104

102

102

200

300

400

500

| UE 502 | RAN 504 | First AMF 506 | SMF 508 | UPF 510 | N3IWF 512 | Second AMF 514 |
|---|---|---|---|---|---|---|

516

518

520

522

524

526

528

530

532

534

538    536

540

600

| UE 602 | RAN 604 | First AMF 606 | SMF 608 | AUSF 610 | UDM 612 | CHF 614 | UPF 616 | N3IWF 618 | Second AMF 620 |

668

670

672

674

676

678

680

684

682

688

686

690

700

800

REGISTRATION AUTHENTICATION BASED ON A TYPE OF AUTHENTICATION PROCEDURE AND A CAPABILITY

CROSS-REFERENCE TO RELATED APPLICATIONS

This application claims priority to U.S. Patent Application Ser. No. 63/161,395 entitled "APPARATUSES, METHODS, AND SYSTEMS FOR REGISTRATION AND CHARGING OF A DEVICE IN A DISASTER ROAMING NETWORK WITH LIMITED ROAMING AGREEMENT" and filed on Mar. 15, 2021 for Roozbeh Atarius, which is incorporated herein by reference in its entirety.

FIELD

The subject matter disclosed herein relates generally to wireless communications and more particularly relates to registration authentication based on a capability.

BACKGROUND

In certain wireless communications networks, a user equipment ("UE") may be authenticated by a public land mobile network ("PLMN"). In such networks, a UE may move from one PLMN to another PLMN.

BRIEF SUMMARY

Methods for registration authentication based on a capability are disclosed. Apparatuses and systems also perform the functions of the methods. One embodiment of a method includes receiving, at a second network device from a first network device, an indication for a capability for a registration. In some embodiments, the method includes transmitting, to a third network device, a first request for a type of authentication procedure for the registration. In certain embodiments, the method includes transmitting, to a remote unit, a second request. The second request corresponds to the type of authentication procedure for the registration. In various embodiments, the method includes receiving, from the remote unit, a response to the second request. The response corresponds to a stored credential in the remote unit.

One apparatus for registration authentication based on a capability includes a second network device. In some embodiments, the apparatus includes a receiver that receives, from a first network device, an indication for a capability for a registration. In various embodiments, the apparatus includes a transmitter that: transmits, to a third network device, a first request for a type of authentication procedure for the registration; and transmits, to a remote unit, a second request. The second request corresponds to the type of authentication procedure for the registration. In certain embodiments, the receiver receives, from the remote unit, a response to the second request. The response corresponds to a stored credential in the remote unit.

Another embodiment of a method for registration authentication based on a capability includes transmitting, from a remote unit to a first network device, a registration request message including an indication for a capability for a registration. In some embodiments, the method includes receiving, from a second network device, a request. The request corresponds to a type of authentication procedure for the registration. In certain embodiments, the method includes transmitting, to the second network device, a response to the request. The response corresponds to a stored credential in the remote unit.

Another apparatus for registration authentication based on a capability includes a remote unit. In some embodiments, the apparatus includes a transmitter that transmits, to a first network device, a registration request message including an indication for a capability for a registration. In various embodiments, the apparatus includes a receiver that receives, from a second network device, a request. The request corresponds to a type of authentication procedure for the registration. In certain embodiments, the transmitter transmits, to the second network device, a response to the request, and the response corresponds to a stored credential in the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
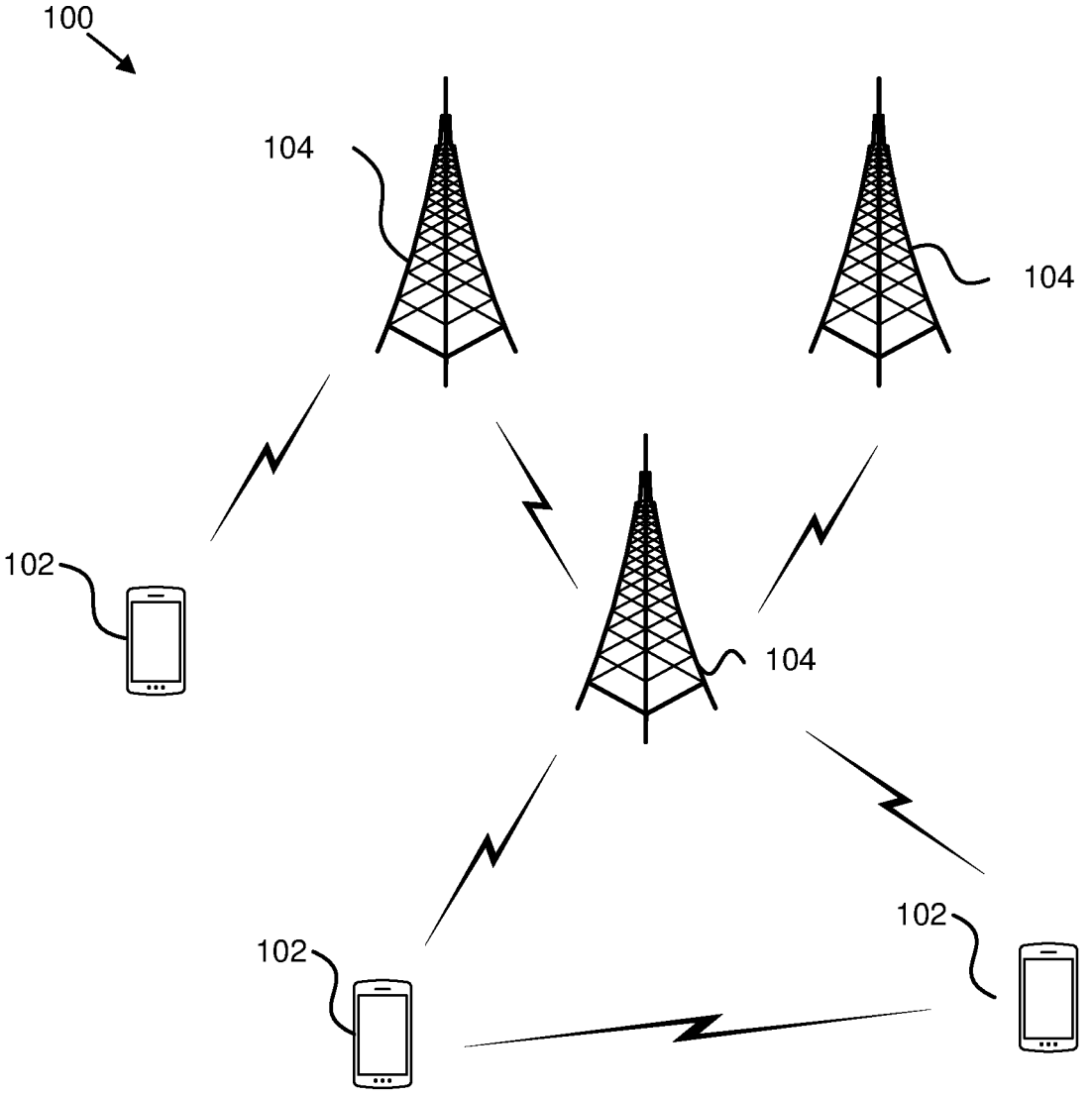
FIG. 1 is a schematic block diagram illustrating one embodiment of a wireless communication system for registration authentication based on a capability.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may; but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for registration authentication based on a capability. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit, from a remote unit to a first network device, a registration request message including an indication for a capability for a registration. In some embodiments, the remote unit 102 may receive, from a second network device, a request. The request corresponds to a type of authentication procedure for the registration. In certain embodiments, the remote unit 102 may transmit, to the second network device, a response to the request. The response corresponds to a stored credential in the remote unit. Accordingly, the remote unit 102 may be used for registration authentication based on a capability.

In certain embodiments, a network unit 104 may receive, at a second network device from a first network device, an indication for a capability for a registration. In some embodiments, the network unit 104 may transmit, to a third network device, a first request for a type of authentication procedure for the registration. In certain embodiments, the network unit 104 may transmit, to a remote unit, a second request. The second request corresponds to the type of authentication procedure for the registration. In various embodiments, the network unit 104 may receive, from the remote unit, a response to the second request. The response corresponds to a stored credential in the remote unit. Accordingly, the network unit 104 may be used for registration authentication based on a capability.

Figure 2:
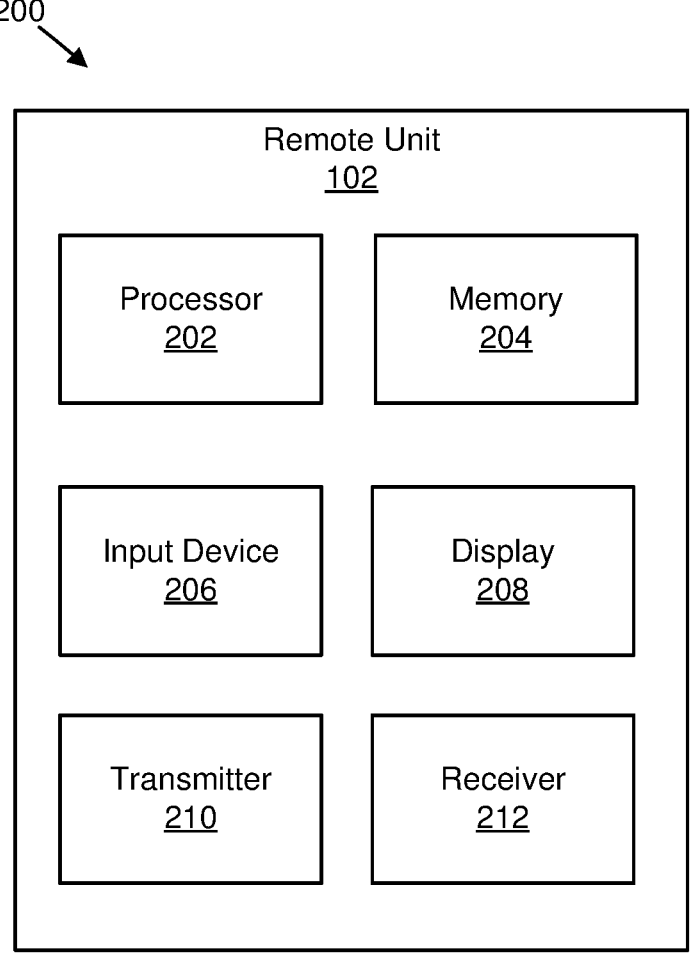
FIG. 2 is a schematic block diagram illustrating one embodiment of an apparatus that may be used for registration authentication based on a capability.

FIG. 2 depicts one embodiment of an apparatus 200 that may be used for registration authentication based on a capability. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits, to a first network device, a registration request message including an indication for a capability for a registration. In various embodiments, the receiver 212 receives, from a second network device, a request. The request corresponds to a type of authentication procedure for the registration. In certain embodiments, the transmitter 210 transmits, to the second network device, a response to the request, and the response corresponds to a stored credential in the remote unit.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
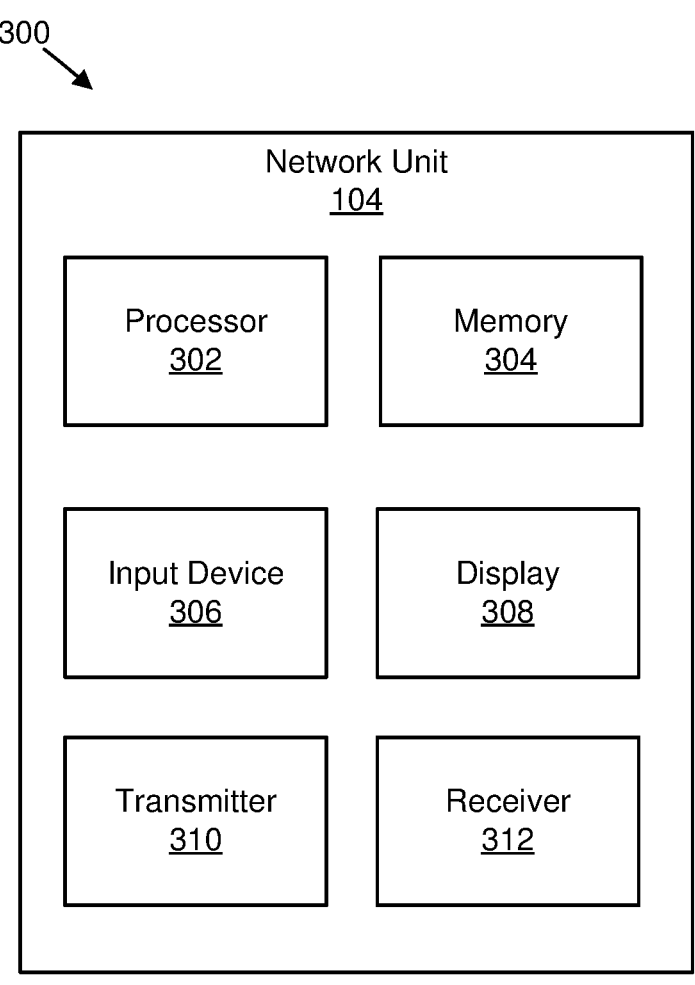
FIG. 3 is a schematic block diagram illustrating one embodiment of an apparatus that may be used for registration authentication based on a capability.

FIG. 3 depicts one embodiment of an apparatus 300 that may be used for registration authentication based on a capability. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives, from a first network device, an indication for a capability for a registration. In various embodiments, the transmitter 310: transmits, to a third network device, a first request for a type of authentication procedure for the registration; and transmits, to a remote unit, a second request. The second request corresponds to the type of authentication procedure for the registration. In certain embodiments, the receiver 312 receives, from the remote unit, a response to the second request. The response corresponds to a stored credential in the remote unit.

It should be noted that one or more embodiments described herein may be combined into a single embodiment.

In certain embodiments, a fifth generation ("5G") system ("5GS") has high reliability and high availability communication services. These features may be available to any type of subscriber and in conditions in which a portion of a network is not available. In particular, a radio access network ("RAN") may have a single point of failures (e.g., antenna towers, single power, or communication cable in fronthaul or backhaul) so that it might happen that due to some extreme conditions one or more cells become unavailable. Such conditions may be called disaster conditions (e.g., "DisasC" as used herein).

In some embodiments, during disaster conditions some subscribers may be out of network coverage. To offer access to general public services and to specific vertical services, a subscriber may be able to use services of another network which is not in a list of preferred networks or even which is in a list of forbidden networks.

Figure 4:
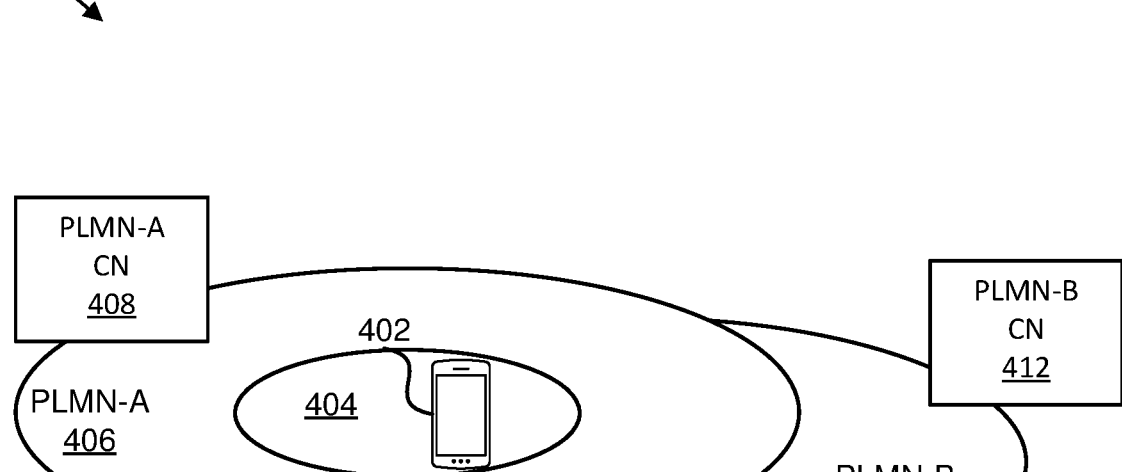
FIG. 4 is a schematic block diagram illustrating one embodiment of a system for disaster conditions.

FIG. 4 is a schematic block diagram illustrating one embodiment of a system 400 for disaster conditions. The system 400 includes a user equipment ("UE") 402 (e.g., disaster inbound roamer) in a disaster conditions area 404 that is further within a first public land mobile network ("PLMN") 406 RAN (PLMN-A) that communicates with a PLMN-A core network ("CN") 408 and with a second PLMN 410 RAN (PLMN-B) that communicates with a PLMN-B CN 412.

Specifically, FIG. 4 shows a scenario corresponding to this document. The UE 402 is a subscriber of PLMN-A 406 (or can be roaming to a visited PLMN-A). Due to disaster condition, the UE 402 may be outside of the RAN coverage of the PLMN-A 406, but in the coverage of PLMN-B 410. The PLMN-B 410 is not in the UE's 402 preferred list of PLMNs or the PLMN-B 410 is in the list of forbidden PLMNs.

Due to the disaster conditions, the UE 402 selects the PLMN-B 410 network and may be able to register with the PLMN-B 410. Such a UE 402 is described as a disaster inbound roamer. There may be 2 options how the UE 402 traffic can reach to public services: 1) a local-break-out ("LBO") traffic; and 2) home-routed ("HR") traffic. The UE 402 should be able to use the voice and/or short message service ("SMS") services from the home network (e.g., PLMN-A 406). Moreover, it is assumed that HR traffic is supported.

As the PLMN-A 406 and PLMN-B 410 are not roaming partners, it is assumed that there is no pre-set standard-compliant roaming interfaces. However, the PLMN-B 410 may be aware that DisasC happened in the PLMN-A 406 network.

In some embodiments, a UE may use subscribed services in a PLMN-A (e.g., voice, SMS, data) while there is an interface between PLMN-A and PLMN-B in place and how to appropriately limit the access of the UE while it is still allowed to be connected to PLMN-A.

Figure 5:
FIG. 5 is a schematic block diagram illustrating one embodiment of a system showing a signal flow for a UE accessing PLMN-A services via limited connectivity in PLMN-B.

FIG. 5 is a schematic block diagram illustrating one embodiment of a system 500 showing a signal flow for a UE accessing PLMN-A services via limited connectivity in PLMN-B. The system 500 includes a UE 502, a RAN 504, a first AMF 506, an SMF 508, a UPF 510, a non-3GPP inter-working function ("N3IWF") 512, and a second AMF 514. The UE 502, the RAN 504, the first AMF 506, the SMF 508, and the UPF 510 may be part of PLMN-B. Further, the N3IWF 512 and the second AMF 514 may be part of PLMN-A. Each of the communications in the system 500 may include one or more messages.

The UE 502 may perform a network selection 516 for a DisasC. In a first communication 518, there may be a radio resource control ("RRC") connection request for DisasC. Moreover, in a second communication 520, there may be a non-access stratum ("NAS") registration request (e.g., including initial, SUCI, PLMN-A ID, DisasC). Further, in a third communication 522, there may be a registration procedure for a disaster with no primary authentication, NAS and/or UP security between the UE 502 and PLMN-B. In a fourth communication 524, there is a registration accept (e.g., allow only limited DisasC protocol data unit ("PDU") sessions). Moreover, in a fifth communication 526 and a sixth communication 528, there is a PDU session establishment request (e.g., for DisasC). Further, in a seventh communication 530, only traffic to PLMN-A's N3IWF may be allowed.

In an eighth communication 532, a PDU session accept is transmitted (e.g., with limited access, PLMN-A's N3IWF). Moreover, in a nineth communication 534, there is IPsec tunnel establishment, registration via untrusted non-3GPP access with PLMN-A, a registration request (e.g., initial registration, source PLMN-A), and a registration accept. Further, in a tenth communication 536 and an eleventh communication 538, a UE successful establishment of IPsec message may be transmitted. The first AMF 506 then determines 540 to keep or deregister the UE 502.

In FIG. 5, after the UE 502 loses the RAN coverage in PLMN-A and can't find any suitable cell from the list of preferred and/or allowed PLMNs. Based on the broadcasted indication in the SI of the PLMN-B cell, the UE 502 determines that the PLMN-A experiences DisasC. The UE 502 applies the network selection procedure for DisasC. As a result, the UE 502 selects to camp on cell from PLMN-B. Upon establishment of RRC connection due to DisasC, an AMF may initiate a security exchange with the UE instead of the primary authentication with the AUSF. Since the primary authentication with the AUSF is not performed, the AMF in PLMN-B may be subject to attack by malicious UEs. The malicious UEs can also include an indicator that it was previously registered to PLMN-A without having PLMN ID part of the SUCI being set to PLMN-A as home PLMN ("HPLMN"). Therefore, there may be a mechanism to avoid attacks on AMF in PLMN-B by the malicious UEs.

In some embodiments, a PLMN-B is able to authenticate a UE if a primary authentication for the UE cannot be executed due to the fact that the roaming interfaces between PLMN-A and PLMN-B are not in place. Moreover, in various embodiments, a charging aspect of a UE in PLMN-B may be used.

In certain embodiments, a PLMN-B is aware that DisasC happened in PLMN-A and PLMN-B has been configured corresponding to an area of DisasC, which means the RAN area and some AMFs are aware about the DisasC in PLMN-A. In such embodiments, it is assumed that a UE may be able to differentiate a network selection of PLMN-B as a normal selection or selection due to DisasC. In other words, the UE may be able to differentiate a registration request due to disaster roaming and a normal registration request.

In some embodiments, a PLMN-B may learn that a disaster happened in PLMN-A and configures the RAN entities to start broadcasting in system information ("SI") that UEs from PLMN-A may be served in PLMN-B due to DisasC. For example, the PLMN-B's OAM system may be informed about the DisasC in a particular area of PLMN-A. The OAM system may configure the RAN entities to broadcast an indication that UEs from PLMN-A may use PLMN-B communications services due to DisasC in PLMN-A.

In various embodiments, a UE is preconfigured or configured with certificates of a back-up network for DisasC (e.g., PLMN-B). If the UE attempts to register with the PLMN-B, the UE uses the certificates during the authentication and security procedures for at least one of the purposes: 1) the PLMN-B is able to authenticate the UE; and 2) the UE is able to authenticate the PLMN-B.

In certain embodiments, a network (e.g., PLMN-B or other network) certificate may be preconfigured or configured in a UE in one of the following ways: 1) stored or updated by the PLMN-A in the UE's universal subscriber identity module ("USIM") profile for the subscription to PLMN-A; and/or 2) stored or updated in the ME part of the UE. The PLMN-A may configure one or more certificates for multiple PLMNs. In such embodiments, each certificate is associated with a network identifier (e.g., PLMN ID or stand-alone non-public network ("SNPN") ID). The PLMN-A may use for a configuration of the certificates either USIM update protocols, of UE parameter update procedure (e.g., triggered from the UDM), or other procedures suitable for this purpose.

In some embodiments, a UE from a PLMN-A which experienced DisasC may select and register with the PLMN-B. The UE is required to be preconfigured with a UE certificate and also certificates that can be used to verify server certificates (e.g., the PLMN-B's certificate). The AUSF in PLMN-B is required to be preconfigured with a AUSF certificate and also certificates that can be used to verify client (e.g., UE) certificates.

Figure 6A:
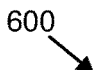
FIGS. 6A and 6B are a schematic block diagram illustrating one embodiment of a system showing a signal flow for registration of a UE to an AMF in PLMN-B for the UE accessing the PLMN-A services via limited connectivity in PLMN-B.
Figure 6B:
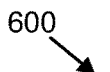

FIGS. 6A and 6B are a schematic block diagram illustrating one embodiment of a system 600 showing a signal flow for registration of a UE to an AMF in PLMN-B for the UE accessing the PLMN-A services via limited connectivity in PLMN-B. The system 600 includes a UE 602, a RAN 604, a first AMF 606 (and/or SEAF), an SMF 608, a AUSF 610, a UDM 612, a CHF 614, a UPF 616, an N3IWF 618, and a second AMF 620. The UE 602, the RAN 604, the first AMF 606, the SMF 608, the AUSF 610, the UDM 612, the CHF 614, and the UPF 616 are part of PLMN-B. Further, the N3IWF 618 and the second AMF 620 are part of PLMN-A. Each of the communications in the system 600 may include one or more messages.

The UE 602 lost coverage in PLMN-A and couldn't find any suitable cell from the list of preferred and/or allowed PLMNs. Based on the broadcasted indication in SI of the PLMN-B cell, the UE 602 determines 622 that the PLMN-A experiences DisasC. The UE 602 applies the network selection procedure for DisasC. As a result, the UE selects to camp on cell from PLMN-B.

The UE's 602 NAS layer is informed about the discovered cell of PLMN-B. The NAS layer creates and sends an NAS registration request message in PLMN-B. The NAS layer triggers the AS layer to establish an RRC connection and indicates that the connection is due to DisasC. With this, the NAS layer may enter a registration sub-state specific to DisasC situation.

In a first communication 624, the RRC entity in the UE 602 sends an RRC connection request message including an DisasC indication. This indication may be used at the RAN node to apply access control or access admission specific for DisasC UEs. In addition, the RAN node may use this indication to select a specific AMF configured to serve DisasC UEs.

In a second communication 626, the NAS registration request message includes a subscription concealed identifier ("SUCI") which is based on a HPLMN subscription permanent identifier ("SUPI") and credentials as the UE 602 is not aware of whether the PLMN-B has a roaming interface with the HPLMN and whether a primary network authentication can be applied. If the UE 602 was previously registered in its HPLMN, the PLMN ID part of the SUCI would contain the HPLMN ID and the UE 602 does not need to include further indications. However, if PLMN-A is not the HPLMN, the UE 602 may include the PLMN-A name (e.g., the source PLMN where the UE 602 experienced the DisasC). In addition, the UE 602 may include an indication that the registration is due to DisasC and an indication that the UE 602 is capable of transport layer security ("TLS") extensible authentication protocol ("EAP") ("TLS-EAP", "EAP-TLS") since the UE 602 may not be aware that PLMN-B has a roaming interface with the HPLMN and thereby is not aware if the primary network authentication may be performed.

In a third communication 628, a fourth communication 630, a fifth communication 632, a sixth communication 634, a seventh communication 636, an eighth communication 638, a nineth communication 640, a tenth communication 642, an eleventh communication 644, a twelfth communication 646, a thirteenth communication 648, a fourteenth communication 650, a fifteenth communication 652, a sixteenth communication 654, and/or a seventeenth communication 656, based on the indication that the registration is due to DisasC and the missing roaming interface to PLMN-A and the indication that the UE 602 is capable of TLS-EAP, the first AMF 606 in PLMN-B determines to apply local registration for DisasC based on TLS-EAP. The first AMF 606 may determine from PLMN ID in SUCI whether to accept the UE 602 to perform registration or not. If the HPLMN is not PLMN-A and the UE 602 was not previously registered in PLMN-A but has included an indication for PLMN-A, the first AMF 606 may determine from that indication whether to accept the UE 602 to perform registration or not. It should be noted that there may be a risk that a malicious UE falsely indicates for PLMN-A. The following procedure may be needed to eliminate the malicious UEs: a) (e.g., step 628) if the first AMF 606 determined to proceed with the registration request, the first AMF 606 may send an EAP request identity to request the UE's 602 identity;

b) (e.g., steps 630, 632, 634) the UE 602 may transmit its peer identity ("Peer ID") from the client_certificate which may conform to grammar for a network access identifier ("NAI") with: a username part as specified for the Peer ID, and a realm set to: "nai.5gc.mnc<MNC>.mcc<MCC>.3gppnetwork.org", where the <MNC> and <MCC> identifying PLMN-A, or an operator domain identifying PLMN-A—the first AMF 606 may forward an identity EAP response to the AUSF 610 in a Nausf_UEAuthentication_Authenticate request message—the first AMF 606 acts as a pass through proxy and the AUSF 610 as the backend server—in case of using an EAP method with tunnel mode, the Peer ID is transmitted after the tunnel is established with the backend server;

c) (e.g., steps 636, 638, 640) with the received Peer ID and the indication that the authentication is due to DisasC, the AUSF 610 chooses EAP-TLS as the authentication method—the choice for using EAP-TLS may be made by the AUSF 610 querying the UDM 612 for the authentication method and includes the indication that the authentication is due to DisasC—the AUSF 610 sends a Nausf_UEAuthentication_Authenticate response message comprising EAP-Request and/or EAP-TLS (TLS start) message to the first AMF 606 which forwards the EAP-Request and/or EAP-TLS (TLS start) in the EAP-Request message towards the UE 602 for authentication purpose—this message may include the ngKSI and the ABBA parameter—the parameter ngKSI may be used by the UE 602 and the first AMF 606 to identify the partial native security context that is created if the authentication is success-ful—the first AMF 606 may set the ABBA parameter—during an EAP authentication procedure, the value of the ngKSI and the ABBA parameter sent by the first AMF 606 towards the UE 602 may not be changed;

d) (e.g., steps 642, 644) the EAP-TLS conversation may start by the UE transmitting an EAP-Response packet with EAP-Type=EAP-TLS towards the AUSF 610—the data field of that packet may encapsulate one or more TLS records including a TLS client_hello hand-shake message;

e) (e.g., steps 646, 648) the AUSF 610 may respond to the UE 602 with an EAP-Request packet with EAP-Type=EAP-TLS—the data field of this packet may encapsulate one or more TLS records including a TLS server_hello handshake message, possibly followed by server_certificate, server_key_exchange, certifica-te_request, server_hello_done, finished handshake messages, and/or a TLS change_cipher_spec mes-sage—the certificate_request message may be included to request the UE to authenticate itself via public key;

f) (e.g., steps 650, 652) the UE 602 authenticates the server with the received message—the UE 602 may respond to the AUSF 610 EAP-Request with an EAP-Response packet of EAP-Type=EAP-TLS with the data field encapsulating one or more TLS records containing a TLS client_key_exchange, change_cipher_spec, cli-ent_certificate, certificate_verify messages, and fin-ished messages—the certificate for the UE's 602 sig-nature public key, while the certificate_verify message comprises the UE's 602 signed authentication response to the first AMF 606; and g) (e.g., steps 654, 656) the AUSF 610 authenticates the UE 602 based on the message received—the AUSF 610 may verify that the client_certificate provided by the UE 602 belongs to the subscriber identified by the Peer ID—if there is a miss-match in the subscriber identi-fiers in the Peer ID, the AUSF 610 does not accept the client_certificate—if the AUSF 610 has successfully verified this message, the AUSF 610 may send an EAP-Success, otherwise it may return an EAP-failure towards the UE 602.

The AUSF 610 may use the most significant 256 bits of an extended master session key ("EMSK") as the K$_{AUSF}$ and then may calculate K$_{SEAF}$ from K$_{AUSF}$—the AUSF 910 sends an EAP-Success message to the first AMF 606 together with the Peer ID and the derived anchor key in the Nausf_UEAuthentication_Authenticate response.

In an eighteenth communication 658 and/or a nineteenth communication 660, the first AMF 606 may continue with the registration procedure and perform a NAS security mode command ("SMC") procedure (e.g., using the derived keys). After successful mutual authentication (e.g., the UE 602 authenticates PLMN-B based on the pre-configured certifi-cates and the PLMN-B authenticates the UE 602), the UE may send its subscriber ID (e.g., SUPI) to the first AMF 606 via an encrypted NAS message. For this purpose, the first AMF 606 may request the subscriber ID from the UE 602. The first AMF 606 may store the UE's 602 SUPI and use it in the signaling exchange with other network functions ("NFs") in PLMN-B (e.g., with the SMF 608). In one embodiment, instead of pre-configuring the policy for mobility management for the DisasC UEs, the PLMN-B may have different agreements with various other networks in case of DisasC. The UDM 612 in the PLMN-B, which may be a specific UDM, may store subscription data specific for PLMN-A or a group of subscribers from PLMN-A. In such case, the first AMF 606 may use the SUPI to select a UDM in the PLMN-B and to retrieve the subscription data from the UDM 612.

In a twentieth communication 662, the first AMF 606 may, after a successful TLS session establishment, send a registration accept message towards the UE 602 including the allowed network slice selection assistance information ("NSSAI"), which may include a single ("S") ("S-NSSAI") identifying a network slice specific to DisasC services. The UE 602 may use the S-NSSAI to request PDU sessions. In addition, the first AMF 606 may indicate that the registration allows limited DisasC PDU sessions only. This indication may be used in the UE 602 to block internally some applications which request mobile originated ("MO") com-munication, but allow specific applications (e.g., the N3IWF client) to request MO communication. The UE's 602 NAS may also use the "limited DisasC PDU Session(s) only" indication to trigger the higher layers to initiate untrusted non-3GPP access towards the HPLMN (e.g., PLMN-A).

In a twenty-first communication 664 and a twenty-second communication 666, the UE 602 sends an NAS session management ("SM") PDU session establishment request to the network. The UE 602 may indicate in the NAS SM message or in the NAS MM message (e.g., carrying the NAS SM message) that the PDU session is for DisasC.

If the first AMF 606 receives the NAS SM message for PDU session establishment, the first AMF 606 applies the DisasC configuration data (or the specific S-NSSAI) to select an appropriate SMF. The first AMF 606 may addi-tionally include the following indications to the SMF 608 in the N11 message (e.g., in Nsmf_PDUSession_CreateSM-Context Request): 1) an indication for DisasC to inform the SMF 608 that DisasC should apply; and/or 2) as the SUPI is not used as subscriber ID, the first AMF 606 may include the PLMN-A ID as indication to the SMF 608 to know which PLMN ID this UE 602 belongs to. The SMF 608 may apply local configuration data for DisasC and the additional indi-cations from the first AMF 606. The SMF 608 may decide to apply limited data connectivity to destination addresses in PLMN-A only. For example, the SMF 608 derives the allowed destination addresses and/or internet protocol ("IP") refixes based on the PLMN-A N3IWF address.

In a twenty-third communication 668, the SMF 608 performs UPF configuration via the N4 procedures. The SMF 608 may send to the UPF 616 the derived connectivity limitation (e.g., allowed destination addresses and/or IP refixes). The UPF 606 applies the configured limitations to the MO traffic.

In a twenty-fourth communication 670, the SMF 608 uses the SUPI received from the first AMF 606 as a key in the signaling exchange with the charging function ("CHF") 614 and to generate charging data records ("CDRs") for this UE 602. In one embodiment, instead of pre-configuring the policy and session data for the DisasC UEs, the PLMN-B may have different agreements with various other networks in case of DisasC. A UDM in the PLMN-B, which may be a specific UDM, may store subscription data specific for PLMN-A or a group of subscribers from PLMN-A. In such case, the SMF 608 may use the SUPI to select a UDM in the PLMN-B and to retrieve the subscription data from the UDM.

In a twenty-fifth communication 672, the SMF 608 sends an NAS SM PDU session establishment accept message to the UE 602. This message may indicate that the data connectivity over the PDU session is limited to PLMN-A's N3IWF 618. If no additional authentication is required with the HPLMN, then the procedure may stop at this point and, depending on the service level agreement ("SLA"), the UE 602 may have access to different operator services or just limited IP connectivity.

In a twenty-sixth communication 674 and twenty-seventh communication 676, the UE 602 internally triggers the discovery and connection to the N3IWF 618 of PLMN-A. The UE 602 initiates the IPsec tunnel establishment procedure with the N3IWF 618.

In a twenty-eighth communication 678, a twenty-nineth communication 680, a thirtieth communication 682, and/or a thirty-first communication 684, after the successful establishment of the IPsec tunnel (e.g., security association) with the N3IWF 618, the UE 602 sends a registration request message to PLMN-A as part of the registration procedure over untrusted non-3GPP access. Since the UE 602 is aware that the registration to PLMN-B is due to DisasC, the UE 602 may additionally include a source PLMN ID (e.g., PLMN-B ID) to indicate to PLMN-A which PLMN is used for limited registration and data connectivity. PLMN-A may use this indication to count the number of UEs using PLMN-B services.

In a thirty-second communication 686 and a thirty-third communication 688, the UPF 616 may determine whether the IPsec tunnel establishment between the UE and the N3IWF is successful. For example, the UPF 616 may apply deep-packet inspection or inspect the source address of the incoming (e.g., downlink) packets. The UPF 616 may verify whether the incoming packets are from the same source to which the UPF 616 filters the outgoing (e.g., uplink) packets. After the UPF 616 has determined that the IPsec is successfully established between the UE 602 and the N3IWF 618, the UPF 616 may inform the SMF 608. The SMF 608 may forward this indication to the first AMF 606 (e.g., via an N11 message).

The indication for successful IPsec establishment is used in the first AMF 606 to verify 690 whether the UE 602 really connects to PLMN-A or whether the registration has been misused by a UE wrongly indicating DisasC. If the first AMF 606 does not receive an indication by the UPF 616 and/or the SMF 608 that the IPsec is successfully established, the first AMF 606 may initiate a deregistration procedure with a transmission to the UE 602.

Figure 7:
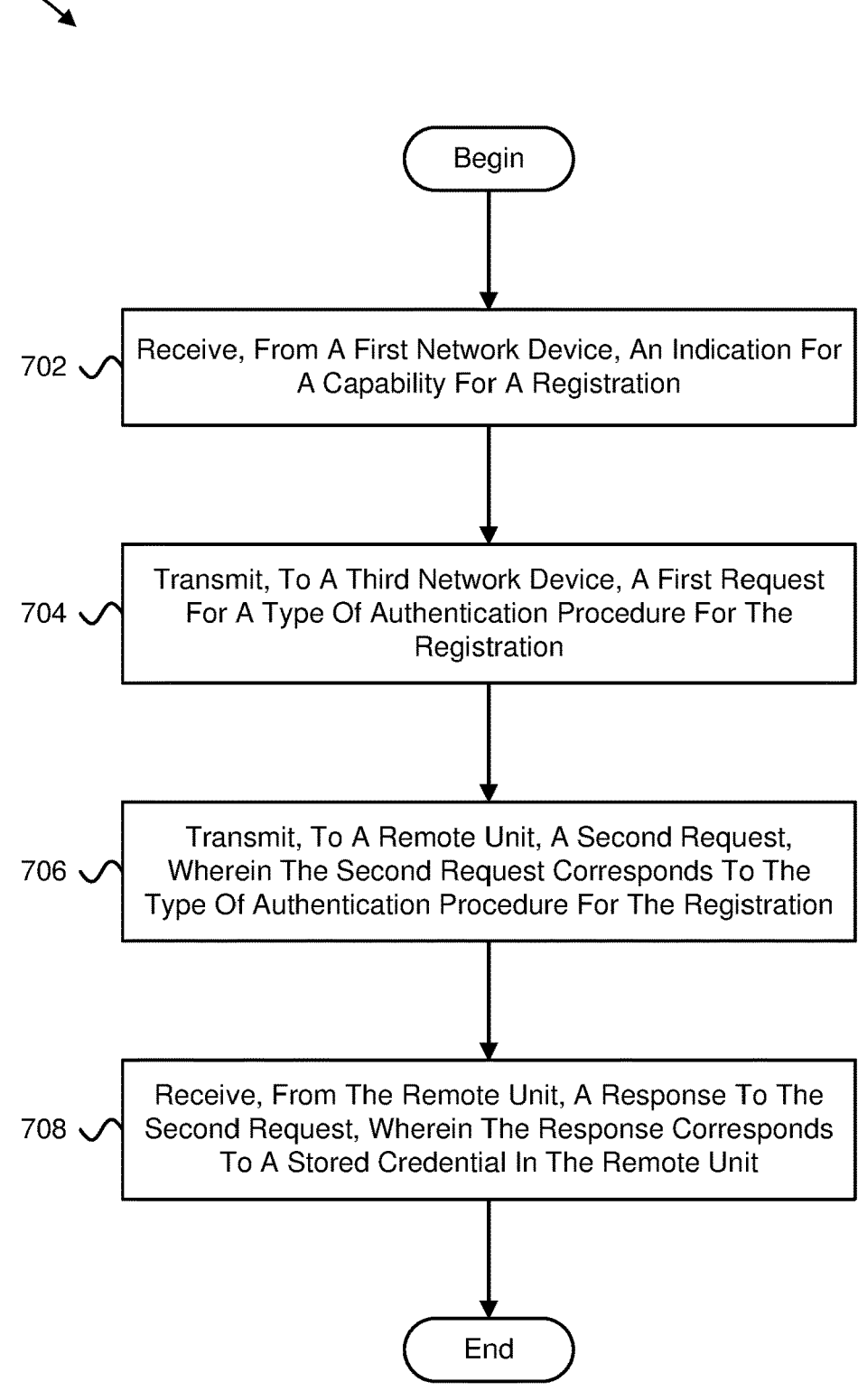
FIG. 7 is a flow chart diagram illustrating one embodiment of a method for registration authentication based on a capability.

FIG. 7 is a flow chart diagram illustrating one embodiment of a method 700 for registration authentication based on a capability. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a second network device from a first network device, an indication for a capability for a registration. In some embodiments, the method 700 includes transmitting 704, to a third network device, a first request for a type of authentication procedure for the registration. In certain embodiments, the method 700 includes transmitting 706, to a remote unit, a second request. The second request corresponds to the type of authentication procedure for the registration. In various embodiments, the method 700 includes receiving 708, from the remote unit, a response to the second request. The response corresponds to a stored credential in the remote unit.

In certain embodiments, the registration corresponds to a disaster condition. In some embodiments, the stored credential is updated by a fourth network device, and the fourth network device is in the disaster condition. In various embodiments, the remote unit comprises a user equipment.

In one embodiment, the first network device comprises an access and mobility management function (AMF). In certain embodiments, the second network device comprises an authentication server function (AUSF).

In some embodiments, the third network device comprises a unified data management (UDM). In various embodiments, the capability for the registration is an authentication protocol.

Figure 8:
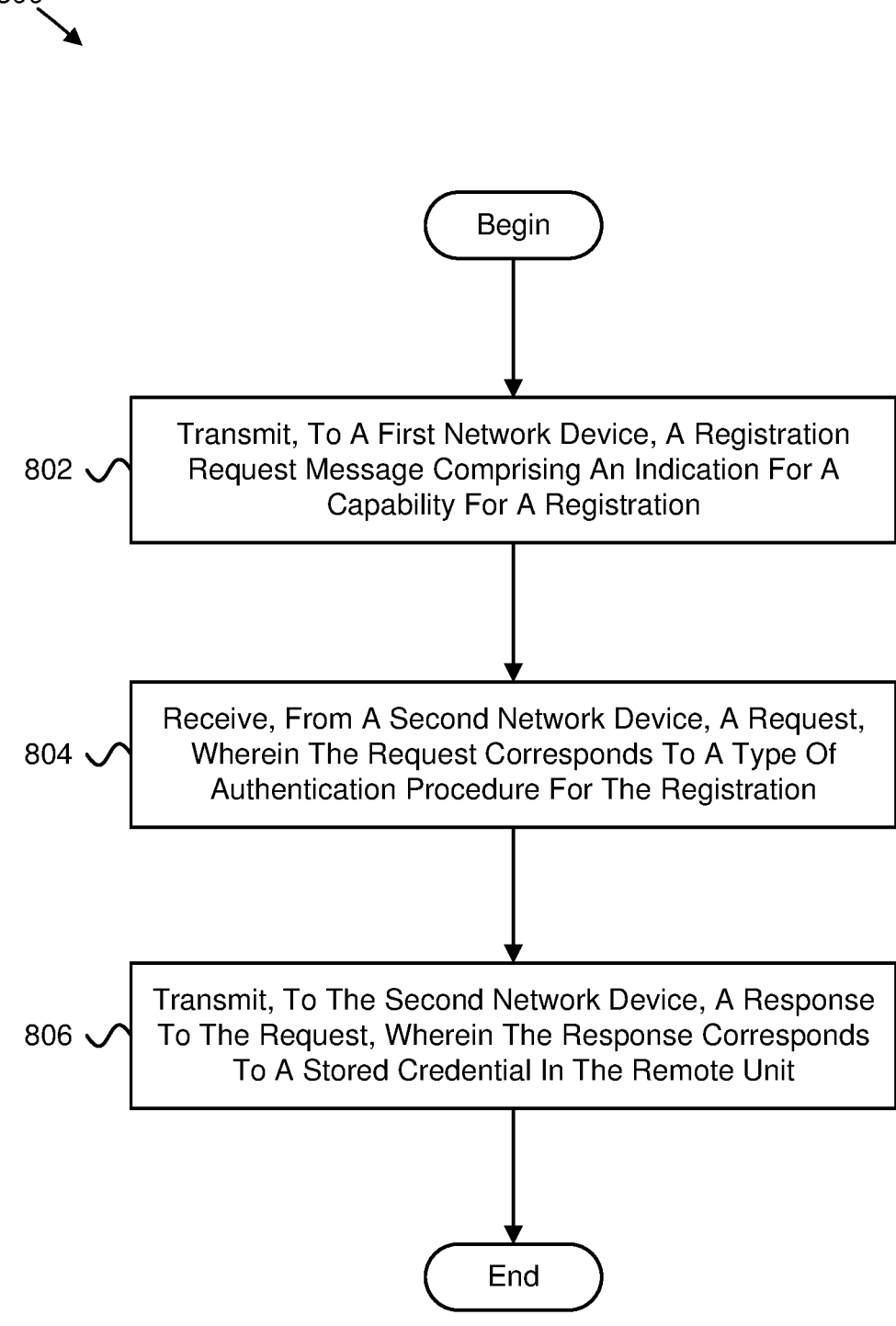
FIG. 8 is a flow chart diagram illustrating another embodiment of a method for registration authentication based on a capability.

FIG. 8 is a flow chart diagram illustrating another embodiment of a method 800 for registration authentication based on a capability. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a remote unit to a first network device, a registration request message including an indication for a capability for a registration. In some embodiments, the method 800 includes receiving 804, from a second network device, a request. The request corresponds to a type of authentication procedure for the registration. In certain embodiments, the method 800 includes transmitting 806, to the second network device, a response to the request. The response corresponds to a stored credential in the remote unit.

In certain embodiments, the registration corresponds to a disaster condition. In some embodiments, the stored credential is updated by a fourth network device, and the fourth network device is in the disaster condition. In various embodiments, the fourth network device is an access and mobility management function (AMF) in a disaster condition.

In one embodiment, the remote unit comprises a user equipment. In certain embodiments, the first network device comprises an access and mobility management function (AMF). In some embodiments, the second network device comprises an authentication server function (AUSF).

In one embodiment, an apparatus comprises a second network device. The apparatus further comprises: a receiver that receives, from a first network device, an indication for a capability for a registration; and a transmitter that: transmits, to a third network device, a first request for a type of authentication procedure for the registration; and transmits, to a remote unit, a second request, wherein the second request corresponds to the type of authentication procedure for the registration, wherein the receiver receives, from the remote unit, a response to the second request, wherein the response corresponds to a stored credential in the remote unit.

In certain embodiments, the registration corresponds to a disaster condition.

In some embodiments, the stored credential is updated by a fourth network device, and the fourth network device is in the disaster condition.

In various embodiments, the remote unit comprises a user equipment.

In one embodiment, the first network device comprises an access and mobility management function (AMF).

In certain embodiments, the second network device comprises an authentication server function (AUSF).

In some embodiments, the third network device comprises a unified data management (UDM).

In various embodiments, the capability for the registration is an authentication protocol.

In one embodiment, a method of a second network device comprises: receiving, from a first network device, an indication for a capability for a registration; transmitting, to a third network device, a first request for a type of authentication procedure for the registration; transmitting, to a remote unit, a second request, wherein the second request corresponds to the type of authentication procedure for the registration; and receiving, from the remote unit, a response to the second request, wherein the response corresponds to a stored credential in the remote unit.

In certain embodiments, the registration corresponds to a disaster condition.

In some embodiments, the stored credential is updated by a fourth network device, and the fourth network device is in the disaster condition.

In various embodiments, the remote unit comprises a user equipment.

In one embodiment, the first network device comprises an access and mobility management function (AMF).

In certain embodiments, the second network device comprises an authentication server function (AUSF).

In some embodiments, the third network device comprises a unified data management (UDM).

In various embodiments, the capability for the registration is an authentication protocol.

In one embodiment, an apparatus comprises a remote unit. The apparatus further comprises: a transmitter that transmits, to a first network device, a registration request message comprising an indication for a capability for a registration; and a receiver that receives, from a second network device, a request, wherein the request corresponds to a type of authentication procedure for the registration, wherein the transmitter transmits, to the second network device, a response to the request, and the response corresponds to a stored credential in the remote unit.

In certain embodiments, the registration corresponds to a disaster condition.

In some embodiments, the stored credential is updated by a fourth network device, and the fourth network device is in the disaster condition.

In various embodiments, the fourth network device is an access and mobility management function (AMF) in a disaster condition.

In one embodiment, the remote unit comprises a user equipment.

In certain embodiments, the first network device comprises an access and mobility management function (AMF).

In some embodiments, the second network device comprises an authentication server function (AUSF).

In one embodiment, a method of a remote unit comprises: transmitting, to a first network device, a registration request message comprising an indication for a capability for a registration; receiving, from a second network device, a request, wherein the request corresponds to a type of authentication procedure for the registration; and transmitting, to the second network device, a response to the request, wherein the response corresponds to a stored credential in the remote unit.

In certain embodiments, the registration corresponds to a disaster condition.

In some embodiments, the stored credential is updated by a fourth network device, and the fourth network device is in the disaster condition.

In various embodiments, the fourth network device is an access and mobility management function (AMF) in a disaster condition.

In one embodiment, the remote unit comprises a user equipment.

In certain embodiments, the first network device comprises an access and mobility management function (AMF).

In some embodiments, the second network device comprises an authentication server function (AUSF).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
   at least one memory; and
   at least one processor coupled with the at least one memory and configured to cause the apparatus to:
      receive, from a first network device, an indication that a registration request corresponds to a disaster condition or a limited roaming condition, wherein the indication includes a capability for performing a registration based on a stored credential;
      transmit, to a third network device, a first request for a type of authentication procedure for the registration, wherein the type of authentication procedure corresponds to the disaster condition or the limited roaming condition;
      transmit, to a remote unit, a second request, wherein the second request corresponds to the type of authentication procedure for the registration; and
      receive, from the remote unit, a response to the second request, wherein the response corresponds to the stored credential in the remote unit that is used for authenticating the registration in an absence of a roaming interface between a home network and a visited network.

2. The apparatus of claim 1, wherein the stored credential is updated by a fourth network device, and the fourth network device is in the disaster condition.

3. The apparatus of claim 1, wherein the remote unit comprises a user equipment (UE).

4. The apparatus of claim 1, wherein the first network device comprises an access and mobility management function (AMF).

5. The apparatus of claim 1, wherein the apparatus comprises an authentication server function (AUSF).

6. The apparatus of claim 1, wherein the third network device comprises a unified data management (UDM).

7. The apparatus of claim 1, wherein the capability for the registration is an authentication protocol.

8. A method of performing a network function, the method comprising:

receiving, from a first network device, an indication that a registration request corresponds to a disaster condition or a limited roaming condition, wherein the indication includes for a capability for performing a registration based on a stored credential;

transmitting, to a third network device, a first request for a type of authentication procedure for the registration, wherein the type of authentication procedure corresponds to the disaster condition or the limited roaming condition;

transmitting, to a user equipment (UE), a second request, wherein the second request corresponds to the type of authentication procedure for the registration; and receiving, from the UE, a response to the second request, wherein the response corresponds to the stored credential in the UE that is used for authenticating the registration in an absence of a roaming interface between a home network and a visited network.

9. A user equipment (UE), comprising:

at least one memory; and at least one processor coupled with the at least one memory and configured to cause the UE to:

transmit, to a first network device, a registration request message comprising an indication that a registration request corresponds to a disaster condition or a limited roaming condition, wherein the indication includes for a capability for performing a registration based on a stored credential;

receive, from a second network device, a request, wherein the request corresponds to a type of authentication procedure for the registration, wherein the type of authentication procedure corresponds to the disaster condition or the limited roaming condition; and transmit, to the second network device, a response to the request, wherein the response corresponds to the stored credential in the UE that is used for authenticating the registration in an absence of a roaming interface between a home network and a visited network.

10. The UE of claim 9, wherein the registration corresponds to a disaster condition.

11. The UE of claim 10, wherein the stored credential is updated by a fourth network device, and the fourth network device is in the disaster condition.

12. The UE of claim 11, wherein the fourth network device is an access and mobility management function (AMF) in a disaster condition.

13. The UE of claim 9, wherein the first network device comprises an access and mobility management function (AMF) and the second network device comprises an authentication server function (AUSF).

14. A processor for wireless communication, comprising:

at least one controller coupled with at least one memory and configured to cause the processor to:

transmit, to a first network device, a registration request message comprising an indication that a registration request corresponds to a disaster condition or a limited roaming condition, wherein the indication includes for a capability for performing a registration based on a stored credential;

receive, from a second network device, a request, wherein the request corresponds to a type of authentication procedure for the registration, wherein the type of authentication procedure corresponds to the disaster condition or the limited roaming condition; and transmit, to the second network device, a response to the request, wherein the response corresponds to the stored credential in the processor that is used for authenticating the registration in an absence of a roaming interface between a home network and a visited network.

15. The processor of claim 14, wherein the stored credential is updated by a fourth network device, and the fourth network device is in the disaster condition.

16. The processor of claim 15, wherein the fourth network device is an access and mobility management function (AMF) in a disaster condition.

17. The processor of claim 14, wherein the first network device comprises an access and mobility management function (AMF) and the second network device comprises an authentication server function (AUSF).

* * * * *